United States Patent
Lee et al.

(10) Patent No.: US 10,078,881 B2
(45) Date of Patent: Sep. 18, 2018

(54) GRAPHICS PROCESSING DEVICE AND OPERATING METHOD FOR PERFORMING TILE-BASED GRAPHICS PROCESSING USING THE SAME

(71) Applicant: Samsung Electronics Co., Ltd., Suwon-si (KR)

(72) Inventors: Sangheon Lee, Hwaseong-si (KR); Kwontaek Kwon, Hwaseong-si (KR); Soojung Ryu, Hwaseong-si (KR); Yeongon Cho, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 62 days.

(21) Appl. No.: 15/248,281

(22) Filed: Aug. 26, 2016

(65) Prior Publication Data

US 2017/0091897 A1 Mar. 30, 2017

(30) Foreign Application Priority Data

Sep. 30, 2015 (KR) .................. 10-2015-0138009

(51) Int. Cl.
*G06T 15/00* (2011.01)
*G06T 1/20* (2006.01)
*G06T 11/40* (2006.01)

(52) U.S. Cl.
CPC .............. *G06T 1/20* (2013.01); *G06T 11/40* (2013.01); *G06T 15/005* (2013.01)

(58) Field of Classification Search
CPC ......... G06T 1/20; G06T 11/40; G06T 15/005; G09G 2360/122
See application file for complete search history.

(56) References Cited

U.S. PATENT DOCUMENTS

| | | | |
|---|---|---|---|
| 8,723,860 B2 | 5/2014 | Redshaw et al. | |
| 2004/0125114 A1* | 7/2004 | Schmidt | G01C 21/3647 345/629 |
| 2007/0146378 A1* | 6/2007 | Sorgard | G06T 15/00 345/581 |
| 2008/0170079 A1* | 7/2008 | Ramshaw | G06T 11/40 345/501 |
| 2010/0177105 A1* | 7/2010 | Nystad | G06T 11/40 345/522 |
| 2011/0292032 A1 | 12/2011 | Yang | |
| 2011/0304608 A1 | 12/2011 | Yang | |
| 2015/0248784 A1* | 9/2015 | Xu | G06T 11/40 345/423 |

FOREIGN PATENT DOCUMENTS

JP 2007-157155 A 6/2007

* cited by examiner

*Primary Examiner* — Diane Wills
(74) *Attorney, Agent, or Firm* — F. Chau & Associates, LLC

(57) ABSTRACT

A method and device for processing graphics data include generating primitives including objects in an image, classifying tiles dividing the image into scalable tile groups, generating a coverage pattern identifying primitives that are covered on tiles included in each scalable tile group, generating a bin stream including the coverage pattern corresponding to the each scalable tile groups, and performing rendering for each tile of the tiles using the bin stream.

18 Claims, 13 Drawing Sheets

TILING PIPELINE (101)
5x5 tile groupS

RENDERING PIPELINE (102)
10x10 tiles

10x10 tiles

2x2 tiles

RENDERING PIPELINE (102)

10x10 tiles

TILING PIPELINE (101)

5x5 tile groupS

GRAPHICS PROCESSING DEVICE AND OPERATING METHOD FOR PERFORMING TILE-BASED GRAPHICS PROCESSING USING THE SAME

CROSS-REFERENCE TO RELATED APPLICATION

This application claims the benefit under 35 USC § 119(a) of Korean Patent Application No. 10-2015-0138009, filed on Sep. 30, 2015, in the Korean Intellectual Property Office, the entire disclosure of which is incorporated herein by reference for all purposes.

BACKGROUND

1. Field

The following description relates to graphics processing devices and operating methods of performing, tile-based graphics pipeline.

2. Description of Related Art

A graphics processing unit, such as a graphics processing unit (GPU), renders graphics data in a computing apparatus. The graphics processing unit generates a frame for display by converting graphics data corresponding to 2-dimensional (2D) or 3D objects to a 2D pixel expression. Examples of the computing apparatus include not only a PC, a laptop, and a video game console, but also embedded or portable devices, such as, for example, a smart phone, a tablet device, and a wearable device. Due to relatively low operation processing capability and high power consumption, it is difficult for embedded devices to have the same graphics processing performance as computing apparatus, which have sufficient memory spaces and processing power. According to the growing supply and availability of portable devices, the frequency of users playing games or viewing content, such as movies or a TV series, through the portable devices is increasing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of processing graphics data, the method including generating primitives including objects in an image, classifying tiles dividing the image into scalable tile groups, generating a coverage pattern identifying primitives that are covered on tiles comprised in each scalable tile group, generating a bin stream including the coverage pattern corresponding to the each scalable tile group, and performing rendering for each tile of the tiles using the bin stream.

Each scalable tile group comprises N×N tiles may be arranged in a square shape.

The coverage pattern may include N×N bit strings indicating whether each tile of the N×N tiles comprises a primitive.

The bin stream may include information about the number of times coverage patterns have same bit strings.

The bin stream may be a bit stream encoded using a run-length algorithm.

The classifying of the tiles may include classifying the tiles based on at least one of a tile size or a resolution of the image.

The classifying of the tiles may include classifying the tiles based on an available size of a cache memory.

The classifying of tiles may include classifying the tiles based on branch points in a tile grouping map.

The tile grouping map may include a bit string having a length equal to a length of the number of tiles.

The method may include reducing a size of a scalable tile group, in response to the size of the bin stream being greater than a threshold range, and increasing the size of the scalable tile group, in response to the size of the bin stream being lesser than the threshold range.

A graphics processing device including a primitive generator configured to generate primitives including objects in an image, a bin stream generator configured to classify tiles dividing the image into scalable tile groups, to generate a coverage pattern identifying the primitives that are covered on tiles comprised in each scalable tile groups, and to generate a bin stream including the coverage pattern corresponding to the each scalable tile group, and a rasterizer configured to render each tile of the tiles using the bin stream.

The each scalable tile group may include N×N tiles arranged in a square shape.

The coverage pattern may include N×N bit strings indicating whether each tile of the N×N tiles comprises a primitive, respectively.

The bin stream may include information about the number of times coverage patterns have same bit strings.

The bin stream may be a bit stream encoded using a run-length algorithm.

The bin stream generator may be further configured to classify the plurality of tiles into the scalable tile groups, based on at least one of a tile size or a resolution of the image.

The graphics processing device may include a cache storing the bin stream, and the bin stream generator is further configured to classify the tiles into the scalable tile groups based on an available size of the cache.

The bin stream generator may be further configured to classify the tiles into the scalable tile groups based on branch points in a tile grouping map.

The bin stream generator may be configured to update the tile grouping map, based on a size of the bin stream corresponding to the each scalable tile group.

The bin stream generator may be configured to update the tile grouping map, based on a size of the bin stream corresponding to the each scalable tile group.

Other features and aspects will be apparent from the following detailed description, the drawings, and the claims.

Figure 1:
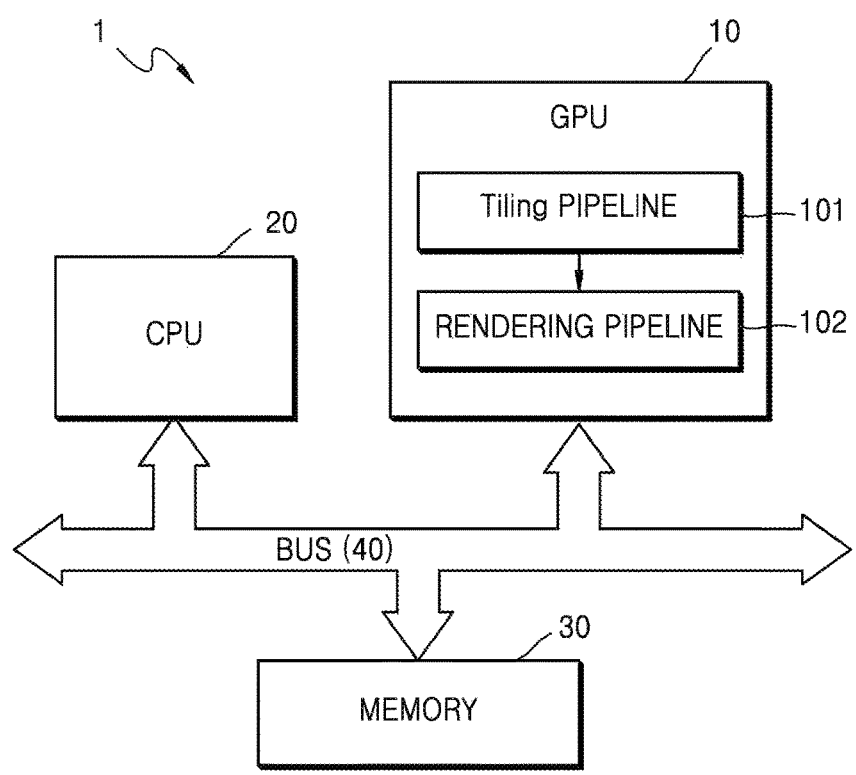
FIG. 1 is a diagram illustrating a computing device according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, etc. may be used herein to describe various elements, these elements should not be limited by these terms. These terms are only used to distinguish one element from another. Thus, a first element, component, region, layer or section discussed below could be termed a second element, component, region, layer or section without departing from the teachings of the inventive concept.

Throughout the specification, a term "unit" used in the specification indicates a software or hardware component such as field-programmable logic array (FPLA) and application-specific integrated circuit (ASIC), and the "unit" performs a particular function. However, the "unit" is not limited to software or hardware. The "unit" may be configured to be stored in an addressable storing medium or to play back one or more processors. Accordingly, the "unit" may include, for example, software components, object-oriented software components, components such as class components and task components, processors, formulas, attributes, procedures, subroutines, segments of program codes, drivers, firmware, micro codes, circuits, data, database, data structures, tables, arrays and variables. Functions provided in components and "units" may be combined into a smaller number of components and "units", or may be further divided into additional components and "units."

FIG. 1 is a diagram illustrating a computing device 1 according to an embodiment.

Referring to FIG. 1, the computing device 1 includes a graphics processing unit (GPU) 10, a central processing unit (CPU) 20, a memory 30, and a bus 40. In FIG. 1, components associated with embodiments are shown as being included in the computing device 1. While components related to the present example are illustrated in the computing device 1 of FIG. 1, it is to be understood that those skilled in the art may include other general-purpose components.

As a non-exhaustive illustration only, the computing device 1 described herein may refer to or be incorporated in devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, video game consoles, television set-top boxes, e-book readers, a setup box, television set-top boxes, e-book readers, robot cleaners, a home appliance, content players, communication systems, image processing systems, graphics processing systems, or any other consumer electronics/information technology (CE/IT) device, or any other device capable of wireless communication or network communication consistent with that disclosed herein. The computing device 1 may be implemented as various devices capable of sensing a user's eye movement, a smart appliance, an intelligent vehicle, or in a smart home system.

The computing device 1 may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard. In another example, the wearable device may be embedded in one or more apparel or footwear worn by the user.

The CPU 20 is configured to control overall operations and functions of the computing device 1. For example, the CPU 20 may drive an operating system (OS), invoke a graphics application programming interface (API) for the GPU 10, and execute a driver of the GPU 10. Also, the CPU 20 may execute various applications stored in the memory 30, such as, for example, a web-browsing application, a game application, and a video application.

The GPU 10 is a graphic-exclusive processor that performs a graphics pipeline, and is configured to execute a 3-dimensional (3D) graphics pipeline to display 3D objects on a 3D image to a 2D image for display. For example, the GPU 10 may perform various functions, such as shading, blending, and illuminating, and may perform various functions for generating pixel values of pixels to be displayed.

The GPU 10 may perform a tile-based graphics pipeline or tile-based rendering (TBR). The term "tile-based" means that each frame of a moving image is divided or partitioned into a plurality of tiles, and rendering is performed per tile.

Referring to FIG. 1, the GPU 10 may perform a graphics pipeline including a tiling pipeline 101 and a rendering pipeline 102. The tiling pipeline 101 is a process of generating a tile list indicating the tiles to which primitives, or patches making up 2D or 3D objects are included.

Since a tile-based architecture may have a low throughput, compared to when a frame is processed per pixel, a mobile device (or an embedded device) that has a low processing performance, such as a smart phone or a tablet device, may use the tile-based architecture as a graphics rendering method. In an example, the tiling pipeline 101 may be replaced by another term, such as a binning pipeline or a binning phase.

The rendering pipeline 102 is a process of rendering an object per tile, based on a bin stream generated in the tiling pipeline 101. When the rendering pipeline 102 is completed, pixel expressions of 2D or 3D objects to be displayed on a 2D display screen may be determined. The rendering pipeline 102 may be replaced by another term, such as a rendering phase.

When the number of tiles increases as a resolution of a frame increases, the tiling pipeline 101 may spend time to generate a bin stream and overheads for storing and/or reading the bin stream in/from the memory 30 may occur. Therefore, a method of efficiently generating a bin stream and an operating method thereof, performed by the tiling pipeline 101, will be described in embodiments below. One or more embodiments described hereinafter may be performed by the GPU 10.

The memory 30 is hardware that stores various types of data processed by the computing device 1, and may store data processed or to be processed by the GPU 10 and the CPU 20. Also, the memory 30 may store applications and drivers to be driven by the GPU 10 and the CPU 20. The memory 30 may include random access memory (RAM), such as dynamic random access memory (DRAM) or static random access memory (SRAM), read-only memory (ROM), electrically erasable programmable read-only memory (EEPROM), a CD-ROM, a Blu-ray or another optical disk storage device, a hard disk drive (HDD), a solid state drive (SSD), or a flash memory, and moreover, the memory 30 may include an external storage device accessible by the computing device 1.

The bus 40 is hardware that connects other pieces of hardware in the computing device 1 such that the other pieces of hardware transmit or receive data to or from each other, and examples of the bus 40 include a peripheral component interconnect (PCI) bus and a PCI express bus.

Figure 2:
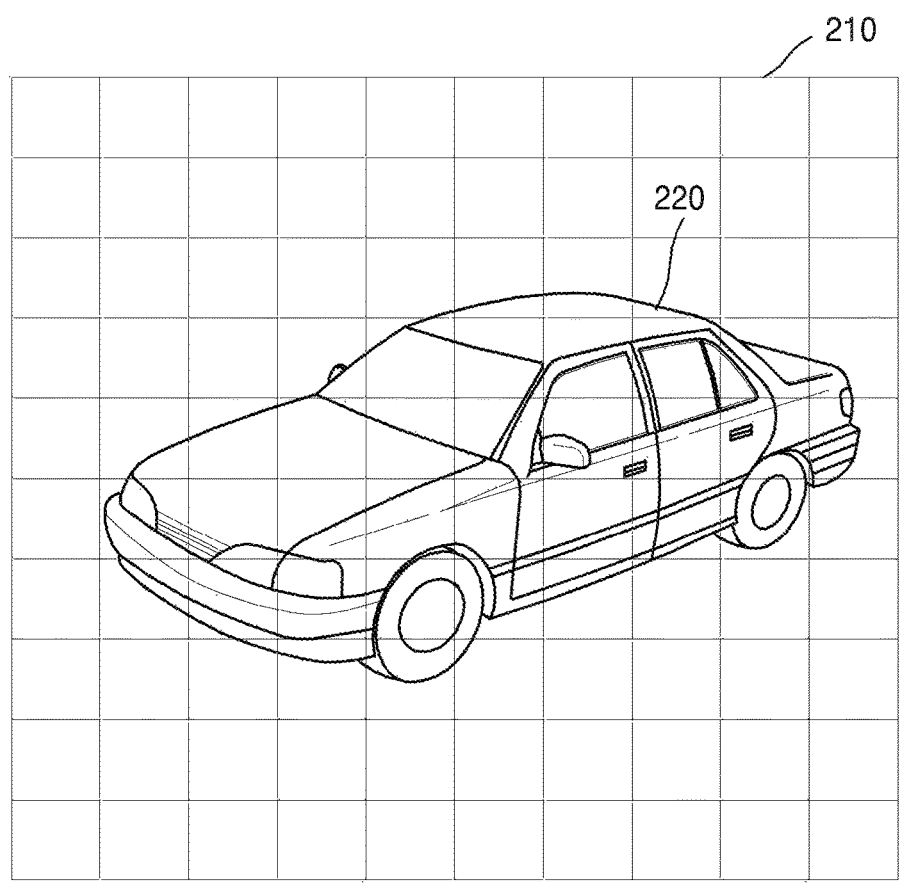
FIG. 2 is a diagram illustrating an example of a tile-based rendering (TBR).

FIG. 2 is a diagram illustrating an example of tile-based rendering (TBR). Referring to FIG. 2, it is assumed that a car object 220 corresponds to one frame of a moving image. The GPU 10 of FIG. 1 partitions the frame including the car object 220 that is in 3D to N×M tiles 210, wherein N and M are each natural numbers. In an example, the tiling pipeline 101 of FIG. 1 may partition the frame including the car object 220 into the tiles 210 and determine which tiles 210 include the car object 220.

The GPU 10 of FIG. 1 renders the car object 220 included in the tiles 210, per tile to convert the car object 220 to pixel expressions. The rendering pipeline 102 of FIG. 1 may render the car object 220 per tile to convert the car object 220 to pixel expressions. As such, in TBR, the car object 220 included in one frame is rendered using the tiles 210.

Figure 3:
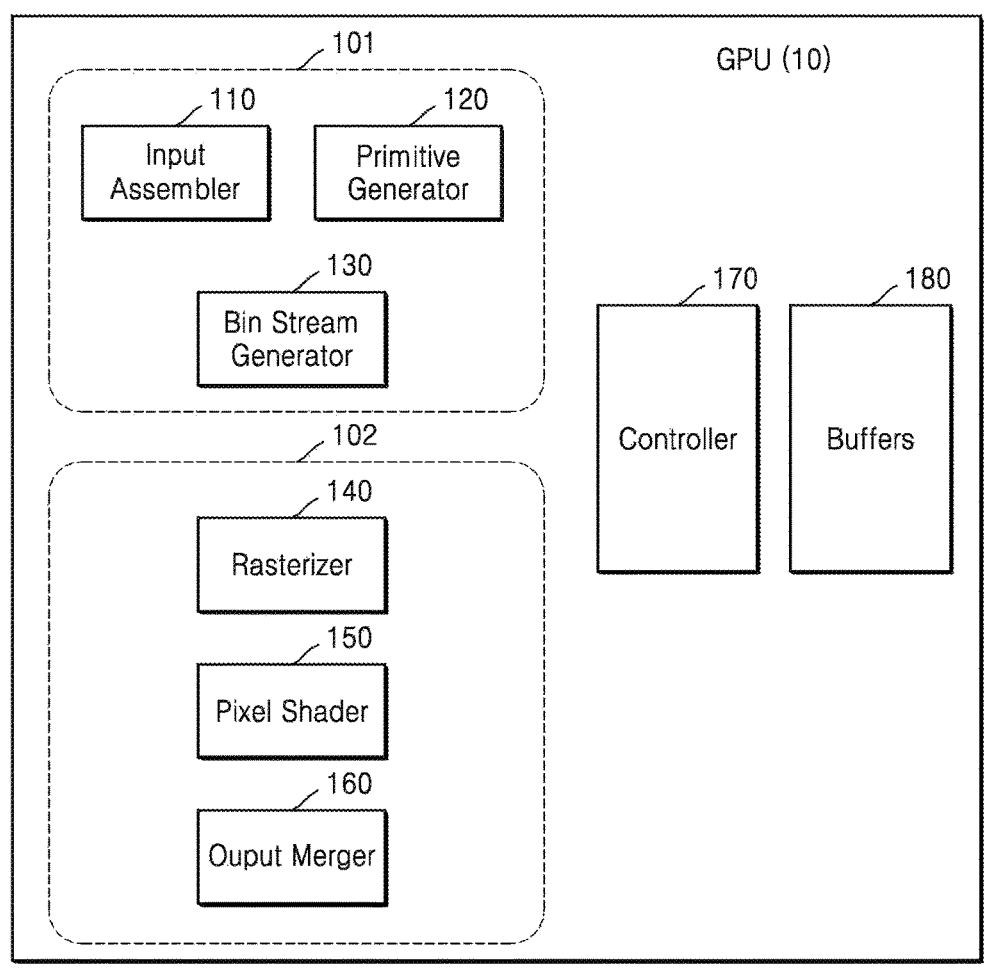
FIG. 3 is a diagram illustrating an example of a detailed hardware structure of a graphics processing unit (GPU) of FIG. 1.

FIG. 3 is a diagram illustrating a detailed hardware structure of the GPU 10 of FIG. 1, according to an embodiment.

Referring to the example of the GPU 10 shown in FIG. 3, the GPU 10 includes a graphics pipeline including a tiling pipeline 101, a rendering pipeline 102, In an example, the GPU 10 may include a controller 170 and buffers 180. In an example, the tiling pipeline 101 includes an input assembler 110, a primitive generator 120, and a bin stream generator 130. In an example, the rendering pipeline 102 includes input assembler 110, a rasterizer 140, a pixel shader 150, and an output merger 160. In an example, the graphics pipeline in the GPU 10 may be classified based on functions. In another example, each of the components performing the graphics pipeline may be realized as sub-processing units (or processing cores) provided in the GPU 10. The names of the above components performing the graphics pipeline may be given based on the functions as described below, however, it would be obvious to one of ordinary skill in the art that the names may vary. For example, according to an embodiment, the bin stream generator 130 and the controller 170 may be separate components, or according to another embodiment, only the controller 170 may be included without a separate bin stream generator 130 as the bin stream generator 130 is included in the controller 170.

The input assembler 110 may supply data of vertices with respect to objects stored in the memory 30 (of FIG. 1) to the graphics pipeline. The data of vertices supplied to the graphics pipeline may be related to a mesh or a patch, which is an expression of a surface, but is not limited thereto.

The primitive generator 120 may include at least one of a vertex shader (not shown), a domain shader (not shown), and a geometry shader. The primitive generator 120 may designate positions of the vertices supplied by the input assembler 110 and may perform shading of the vertices. Furthermore, the primitive generator 120 may generate a primitive formed by using at least one vertex. In an embodiment, the primitive may be represented by a polygon, such as, for example, a triangle formed by connecting vertices. The triangular shape of the primitive is only non-exhaustive illustrations, and other shapes are considered to be well within the scope of the present disclosure.

The bin stream generator 130 may perform tiling (or binning) using primitives output from the domain shader (not shown) or the geometry shader (not shown). In other words, the bin stream generator 130 may generate (or perform binning) a bin stream indicating information identifying primitives covered by tiles.

The rasterizer 140, based on the generated bin stream, may convert the primitives output from the domain shader (not shown) or the geometry shader (not shown) into pixel values in a 2D space.

The pixel shader 150 may perform additional operations, such as a depth test, clipping, scissoring, or blending, corresponding to pixels. A result of pixel shading of the pixel shader 150 may be stored in the buffers 180 by the output merger 160, and may be displayed on the computing device 1 as a frame of a moving image.

The controller 170 may control general functions and operations of components 110 through 160 of the graphics pipeline and the buffers 180, respectively.

The number of tiles and primitives may increase as resolutions of images processed by the GPU 10 increase. Therefore, the number and size of bin streams generated by the tiling pipeline 101 may increase excessively. This may unnecessarily reduce the processing efficiency of the tiling pipeline 101. Therefore, according to an embodiment, the bin stream generator 130 may group (or classify) tiles by dividing an image in a scalable way, and may generate a bin stream by grouped tiles units. The method of generating a bin stream, by the bin stream generator 130, by grouped tiles units will be described in detail with reference to drawings below.

FIG. 4 is an example of a diagram illustrating a relationship between graphics processing performance (or efficiency) and the number of tiles for partitioning an image.

Figure 4A:
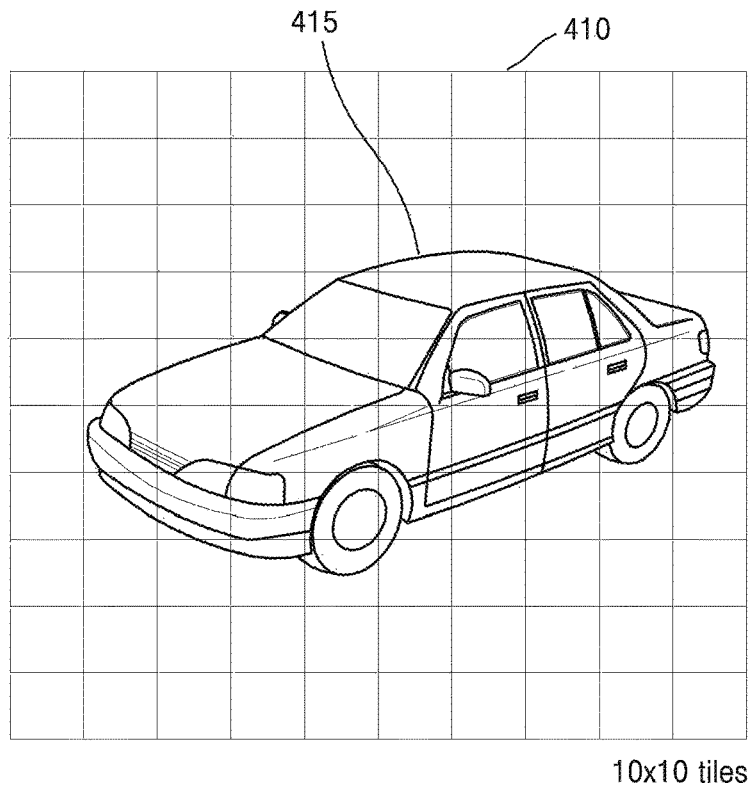
FIGS. 4A and 4B are diagrams illustrating examples of a relationship between graphics processing performance (or efficiency) and the number of tiles for partitioning an image.
Figure 4B:
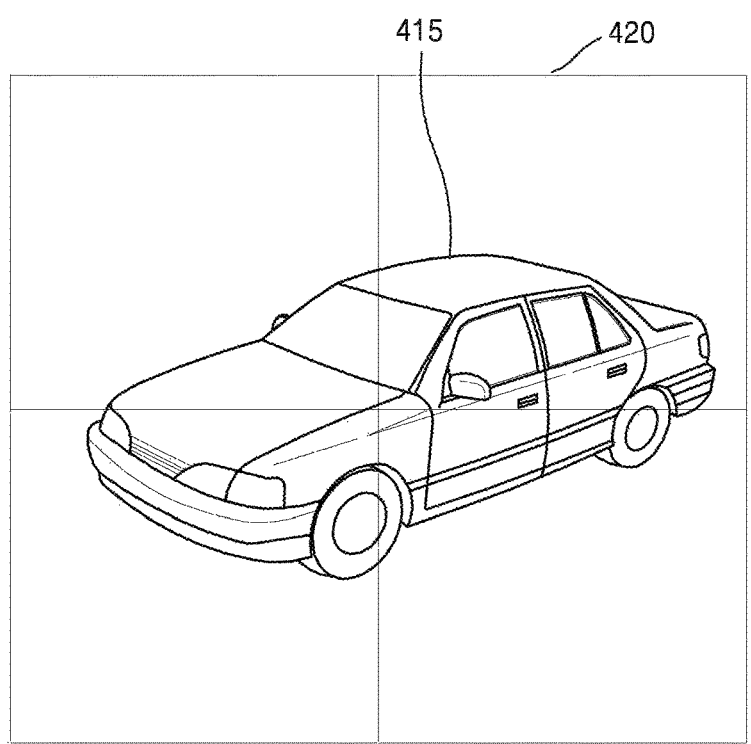

FIG. 4A illustrates an example when an object 415 included in the image is partitioned into 10×10 tiles 410, and FIG. 4B illustrates an example when the object 415 is partitioned into 2×2 tiles 420. When the GPU 10 generates bit streams per tile, tiling (or binning) with respect to the object 415 of FIG. 4A may be performed on 100 tiles. For example, the GPU 10 may generate 100 bin streams. On the other hand, tiling with respect to the object 415 of FIG. 4B may be performed only on 4 tiles. For example, the GPU 10 may generate 4 bin streams. Therefore, a time for performing a tiling pipeline may be saved as the number of tiles is reduced. As a probability of storing bin streams generated as a tiling result in the memory 30 (of FIG. 1) is reduced, wherein the bin streams exceed an available space of a cache memory in the GPU 10, a probability of generating overheads due to the rasterizer 140 (of FIG. 3) reading a bin stream stored in the memory 30 may also be reduced.

Since only about ⅓ of the tiles 410 overlap the object 415 in FIG. 4A, rendering may be skipped on the remaining ⅔ of the tiles 410. On the other hand, since the 4 tiles 420 of FIG. 4B all overlap the object 415, graphics processes may be performed on all the 4 tiles 420. Furthermore, in FIG. 4B, since the number of objects included in one thread is much greater, compared to FIG. 4A, the processing efficiency of the rendering pipeline 102 decreases as thread complexity increases. Therefore, dividing the object 415 as in FIG. 4B may not be definitely favorable, compared to the case of FIG. 4A.

Figure 5:
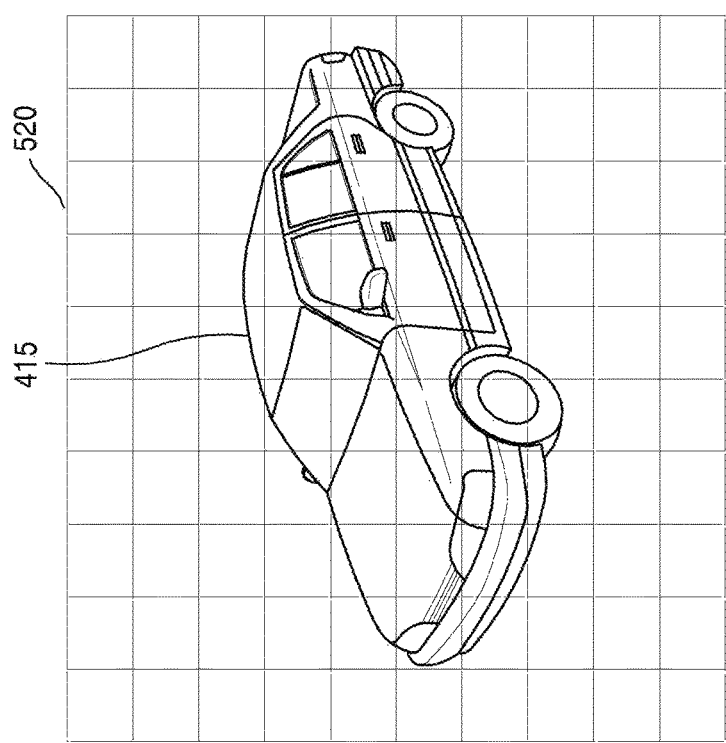
FIG. 5 is a diagram illustrating an example of a method of performing a graphics pipeline.
Figure 5:
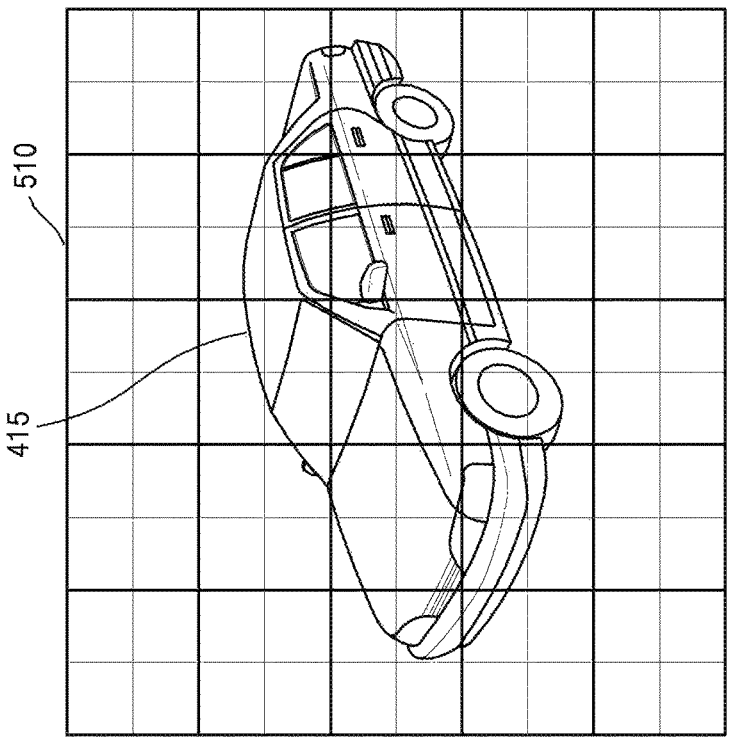

FIG. 5 is a diagram illustrating a method of performing a graphics pipeline, according to an embodiment.

As described in FIG. 4, increasing a tile size may not be favorable to improve graphics processing performance (or efficiency). Therefore, the GPU 10 according to an embodiment may generate a bin stream per group by grouping (or classifying) tiles 510 in a scalable way and performing a tiling pipeline 101, as illustrated on the left side of FIG. 5, and may perform a rendering pipeline 102 per tile with respect to tiles 520 by using the bin stream generated per group, as illustrated on the right side of FIG. 5.

Furthermore, the GPU 10 according to an embodiment may improve the processing efficiency of the tiling pipeline 101 by adjusting the number (that is, 2×2) of grouped tiles in a scalable way.

Figure 6:
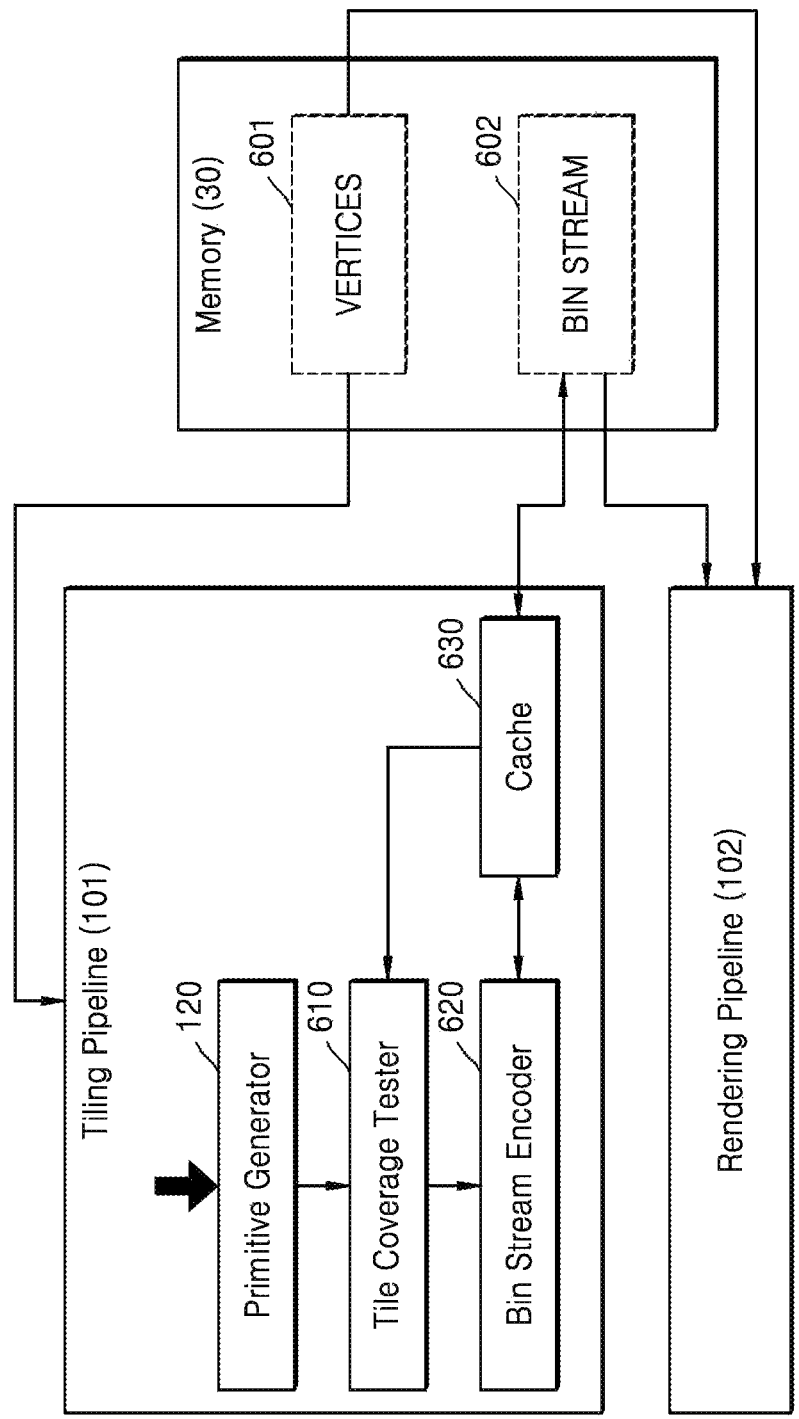
FIG. 6 is a diagram illustrating a graphics pipeline performed in a GPU, according to an embodiment.

FIG. 6 is a diagram illustrating a graphics pipeline performed by the GPU 10, according to an embodiment.

The graphics pipeline including the tiling pipeline 101 and the rendering pipeline 102 of FIG. 6 will be described in relation to hardware components of the GPU 10 of FIG. 3, wherein only components related to an embodiment are described. Thus, those skilled in the art may include general-purpose components and pipeline stages other than those described with reference to FIG. 6, without departing from the spirit and scope of the illustrative examples described.

As described in FIG. 3, a primitive generator 120 may perform shading of vertices 601 representing objects in an image stored in the memory 30 (of FIG. 1) and may generate primitives formed using at least one vertex.

A tile coverage tester 610 may group or classify a plurality of tiles dividing an image into scalable tile groups. The scalable tile groups may include N×N tiles arranged in a square shape in an image.

Sizes of the scalable tile group may be determined based on at least one of a tile size and a resolution of the image. For example, when a tile size is 4×4 pixels, sizes of the scalable tile groups may be 16×16 tile sizes. Furthermore, when a tile size is 16×16 pixels, sizes of the scalable tile groups may be 4×4 tile sizes. In another example, sizes of the scalable tile groups may be determined according to an available space of a cache 630. For example, when a remaining available space of a cache 630 is ¾ or more, sizes of the scalable tile groups may be substantially the same as a tile size. However, when a remaining available space of a cache 630 is ¼ or less, sizes of the scalable tile groups may be 16×16 tile sizes.

Furthermore, a tile coverage tester 610 may generate a coverage pattern identifying primitives that are covered on each scalable tile group. The coverage pattern may be N×N bit strings indicating whether each of the N×N tiles included in the scalable tile group overlap the primitives.

For example, a tile coverage tester 610 may identify primitives covered on tiles by performing rasterization. Furthermore, the tile coverage tester 610 may generate a coverage pattern indicating information of the tiles in the scalable tile groups, wherein the tiles overlap the identified primitives. The method of generating a coverage pattern by the tile coverage tester 610 will be described with reference to FIG. 7.

A bin stream encoder 620 may generate a bin stream 602 including the coverage pattern per scalable tile group. The bin stream 602 may be a bit stream generated per scalable tile group. Furthermore, the bin stream 602, corresponding to each of the scalable tile groups, may include information about the number of repetition times, in which coverage patterns corresponding to primitives and coverage patterns having the same bit strings are repeated. Furthermore, the bin stream 602 may be a value of the coverage patterns encoded by a run-length algorithm. The run-length algorithm is a lossless data encoding method of writing the number of data repetition times.

For example, when the bin stream encoder 620 encodes coverage patterns corresponding to ten primitives per scalable tile group including 2×2 tiles, the bin stream is '1010101100001111' if coverage patterns corresponding to first to third primitives are the same as '1010', and coverage patterns corresponding to fourth to tenth primitives are the same as '0000'. The method of generating the bin stream 602 by the bin stream encoder 620 will be described in detail with reference to FIG. 8.

Furthermore, a tiling pipeline 101 may store the bin stream 602 output by the bin stream encoder 620 in the cache 630. Therefore, when a primitive generator 120 sequentially outputs (in other words, pipelines) primitives, the bin stream encoder 620 may read and update the bin stream 602 stored in the cache 630. In general, the cache 630 has a small storage space, and thus, cache miss may increase as a size of the bin stream 602 increases.

Meanwhile, when a tiling pipeline generates a bin stream per tile, a size of a bin stream generated corresponding to four tiles may be 26 bits. This is about 1.5 times a size (that is, 16 bits) of a bin stream generated by the tiling pipeline 101 according to the embodiment disclosed above. As such, the tiling pipeline 101 according to the disclosed embodiment may improve a probability of cache hits by generating the bin stream 602 including a coverage pattern.

Meanwhile, the tile coverage tester 610, the bin stream encoder 620, and the cache 630 may correspond to the bin stream generator 130 of FIG. 3. Furthermore, names of the above components performing the tiling pipeline may be given based on the functions described above, but it would be obvious to one of ordinary skill in the art that the names may vary.

When the tiling pipeline 101 is completed, the GPU 10 may perform a rendering pipeline 102 per tile based on the bin stream 602 generated per scalable tile group. For example, the rendering pipeline 102 may read the bin stream 602 stored in the cache 630 or the memory 30 and may perform rendering per tile. Therefore, as reading a bin stream by scalable tile units, the GPU 10 may reduce overheads accessing the memory 30. Meanwhile, the rendering pipeline 102 may perform pipeline stages according to the rasterizer 140, the pixel shader 150, and the output merger 160 illustrated in FIG. 3.

The tiling pipeline 101 of FIG. 6 may complete an operation by generating and processing threads by the number of scalable tile groups. Furthermore, the tiling pipeline 101 may reduce overheads of the GPU 10 accessing the memory 30 by reducing a size of the bin stream 602. Therefore, the processing efficiency of the tiling pipeline 101 may be improved.

Figure 7:
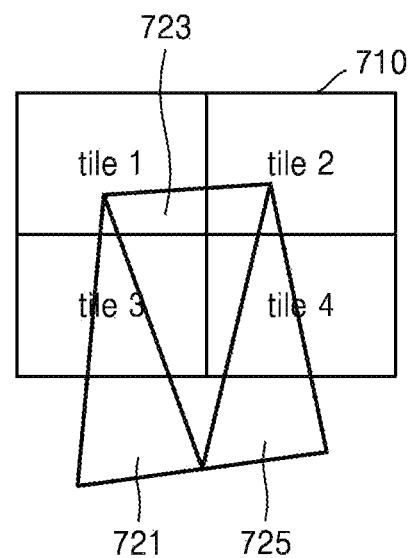
FIG. 7 is a diagram illustrating a method of generating a coverage pattern, according to an embodiment.

FIG. 7 is a diagram illustrating a method of generating a coverage pattern, according to an embodiment.

Referring to FIG. 7, a coverage pattern of a scalable tile group 710 including 2×2 tiles may be four bit strings. Since a first primitive 721 overlaps first and third tiles among first to fourth tiles included in the scalable tile group 710, a coverage pattern corresponding to the first primitive 721 is '1010'. Since a second primitive 723 overlaps first to fourth tiles included in the scalable tile group 710, a coverage pattern corresponding to the second primitive 723 is '1111'. Since a third primitive 725 overlaps second and fourth tiles among first to fourth tiles included in the scalable tile group 710, a coverage pattern corresponding to the third primitive 725 is '0101'.

Figure 8:
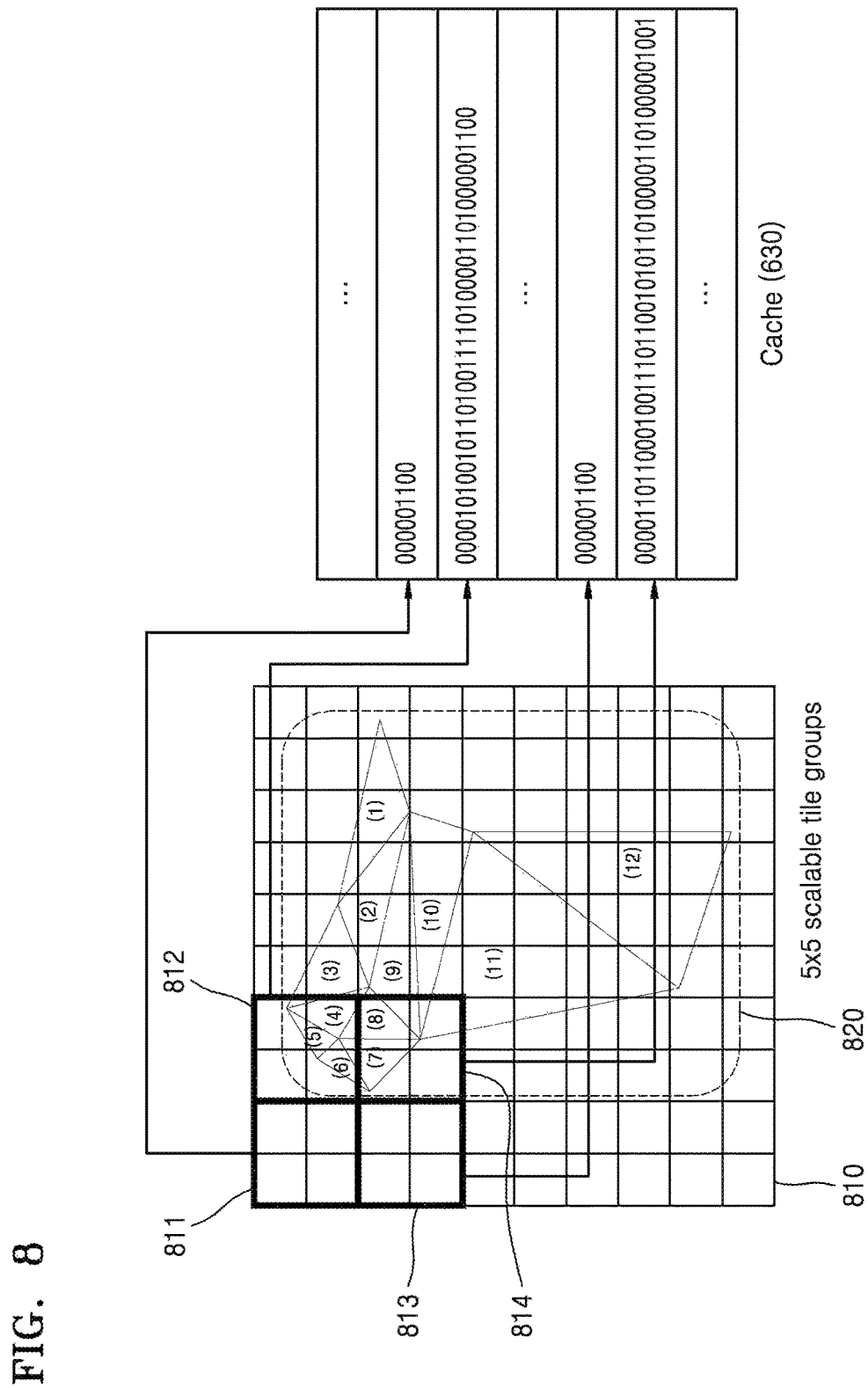
FIG. 8 is a diagram illustrating an example of a method of generating a bin stream including coverage patterns by a bin stream encoder of FIG. 6.

FIG. 8 is a diagram illustrating a method of generating a bin stream including coverage patterns by the bin stream encoder of FIG. 6, according to an embodiment.

In FIG. 8, it is assumed that the tiling pipeline 101 divides 10×10 tiles 810 into 5×5 scalable tile groups, for example, first, second, third, and fourth scalable tile groups 811, 812, 813, and 814. Furthermore, it is assumed that an object in an image includes 12 primitives 820.

As described above, the bin stream encoder 620 (of FIG. 6) may generate the bin stream 602 including coverage patterns corresponding to the first to fourth scalable tile groups 811 to 814, respectively. The coverage patterns may be bit strings identifying primitives covered on the scalable tile groups, wherein the bit strings are output from the tile coverage tester 610 (of FIG. 6). For example, as there is no primitive covered on the first scalable tile group 811, coverage patterns corresponding to the first scalable tile group 811 may be {0000, 0000, 0000, 0000, 0000, 0000, 0000, 0000, 0000, 0000, 0000, 0000}. On the other hand, coverage patterns corresponding to the first scalable tile group 811 may be {0000, 0000, 0101, 0101, 0111, 0111, 0001, 0001, 0000, 0000, 0000, 0000}.

The bin stream encoder 620 may encode the coverage patterns based on a run-length algorithm. For example, the coverage patterns of the first scalable tile group 811 may be encoded as '000001100'. Here, upper 4 bits of the generated bit stream may be a coverage pattern and lower 4 bits may be the number of coverage pattern repetition times. For example, the coverage patterns of the second scalable tile group 812 may be encoded as '00001010010110100111101000011010000001100'. Here, the generated bit stream may include a coverage pattern (upper 4 bits) and the number of coverage pattern repetition times (lower 4 bits) per 8 bit unit.

The tiling pipeline 101 may store the generated bit, as the bin stream 602, in cache 630.

Although FIG. 8 illustrates that the tile coverage tester 610 outputs coverage patterns arranged by the number of primitives 820 to the bin stream encoder 620, coverage patterns identifying one primitive covered on each of the scalable tile groups may be output to the bin stream encoder 620, according to a method of realizing tiling pipeline stages. For example, the tile coverage tester 610 may output '0000' identifying a primitive (that is, primitive 3) covered on the first scalable tile group 811 and '0101' identifying a primitive (that is, primitive 3) covered on the second scalable tile group 812. Here, the bin stream encoder 620 may update bin streams per scalable tile group, in which the bit strings are stored in the cache 630 (of FIG. 6).

Figure 9:
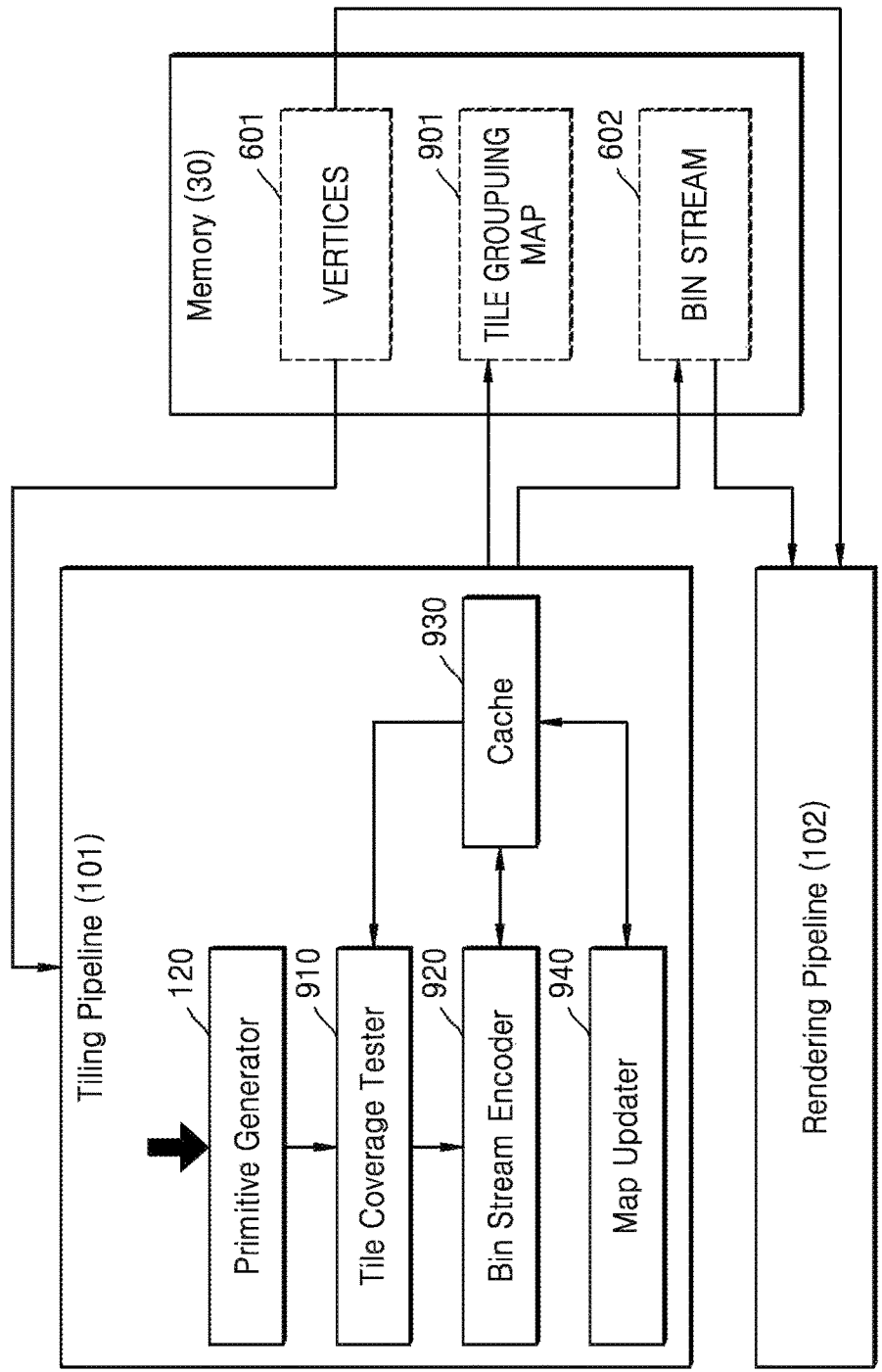
FIG. 9 is a diagram illustrating an example of a graphics pipeline performed in a GPU.

FIG. 9 is a diagram illustrating a graphics pipeline performed by the GPU 10, according to another embodiment.

The graphics pipeline including the tiling pipeline 101 and the rendering pipeline 102 of FIG. 9 will be described in relation to components of the graphics pipeline of FIG. 6, wherein only components related to an embodiment and pipeline stages are described. Thus, one of ordinary skill in the art may include other general-purpose components and pipeline stages without departing from the spirit and scope of the illustrative examples described.

A tile coverage tester 910 may classify a plurality of tiles dividing a frame into scalable tile groups, based on a tile grouping map 901. The tile grouping map 901 may include branch points to classify a plurality of tiles into scalable tile groups. Furthermore, the tile grouping map 901 may be a bit string which has a same length as a length of the number of tiles (that is, n×m, wherein n and m are natural numbers).

The tile grouping map 901 may be updated when the GPU 10 performs the tiling pipeline 101 corresponding to a plurality of frames. When the GPU 10 performs a graphics pipeline corresponding to a first frame, the tile grouping map 901 may include initial branch points classifying a plurality of tiles into the same number (Le, N×N) of tiles determined based on at least one of a tile size and a resolution of an image. The tile coverage tester 910 and a bin stream encoder 920 may generate a bin stream per scalable tile group, based on scalable tile groups classified by the initial branch points of the tile grouping map 901. As operations of the tile coverage tester 910 and the bin stream encoder 920, which generate a coverage pattern and a bin stream, correspond to operations of the coverage tester 610 and the bin stream encoder 620 of FIG. 6, which are incorporated herein by reference. Thus, the above description may not be repeated here.

A map updater 940 may update locations of branch points included in the tile grouping map 901, based on a size of a bin stream corresponding to each of the scalable tile groups. For example, the map updater 940 may determine whether the size of the bin stream corresponding to each of the scalable tile groups is within a threshold range. The map updater 940 may update the tile grouping map 901 to reduce a size of corresponding scalable tile group if the size of the bin stream corresponding to each of the scalable tile groups is within the threshold range. In another example, if the size of the bin stream is beyond the threshold range, the map updater 940 may update the tile grouping map 901 to increase a size of corresponding scalable tile group. When the GPU 10 performs a graphics pipeline corresponding to a second frame, the tile coverage tester 910 may classify a plurality of tiles into scalable tile groups according to the updated tile grouping map 901. The GPU 10 may update the tile grouping map 901 until when processing of a graphics pipeline is completed, wherein the processing corresponds to a plurality of frames included in an image. As such, the tiling pipeline 101 may prevent a generation of a bin stream having an excessively large size by adjusting a size of each of the scalable tile groups.

In an example, the threshold range may be determined based on at least one of a size of a coverage pattern and the number of primitives. For example, when a size of a coverage pattern is 4 and the number of primitives is 10, the threshold range may be 10 or more and 59 or less. This may reflect an average value of the sizes of bin streams, in which the average value may be generated by using a run-length algorithm.

According to an embodiment, the tiling pipeline 101 may limit scalable tile group units in a square shape, to minimize computations of a tile grouping map. However, the inventive concept is not limited thereto. The tiling pipeline 101 may generate a rectangular scalable tile group according to another embodiment.

When the tiling pipeline 101 is completed, the GPU 10 may perform a rendering pipeline 102 per tile based on a bin stream generated per scalable tile group. The rendering pipeline 102 may perform pipeline stages according to the rasterizer 140, the pixel shader 150, and the output merger 160 illustrated in FIG. 3.

Although the map updater 940 is described as a component of the tiling pipeline 101, the map updater 940 may be included in the bin stream encoder 920 according to an embodiment. In another example, the map updater 940 may be included in the controller 170 (of FIG. 3).

Figure 10:
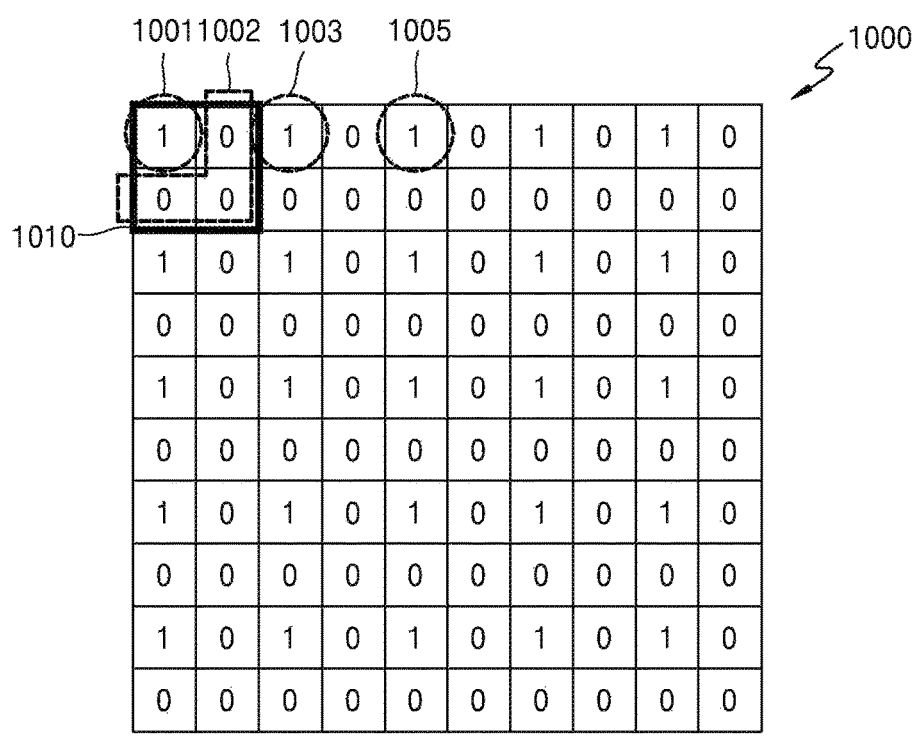
FIG. 10 is a diagram illustrating an example of a tile grouping map.

FIG. 10 is a diagram illustrating a tile grouping map 1000 according to an embodiment.

The tile grouping map 1000 of FIG. 10 may include bits 1001, 1003, and 1005 classifying 10×10 tiles into 5×5 scalable tile groups. As described above, the tile grouping map 1000 may be indicated as a bit string which has a same length as a length of the number of tiles (i.e., 10×10). For example, the tile grouping map 1000 may include bits corresponding to tiles dividing a frame. Therefore, each bit of the tile grouping map 1000 may represent whether a tile corresponding to each bit is a branch point classifying tiles into scalable tile groups. As illustrated in FIG. 10, a first bit 1001 corresponding to a first tile included in the first scalable tile group 1010 may be '1', and bits 1002 corresponding to remaining tiles included in the first scalable tile group 1010 may be '0'.

As such, the tile coverage tester 910 (of FIG. 9) may sequentially read bits of the tile grouping map 1000 and may identify 5×5 scalable tile groups with the bits 1001, 1003, and 1005 having a value of '1' as branch points.

Figure 11:
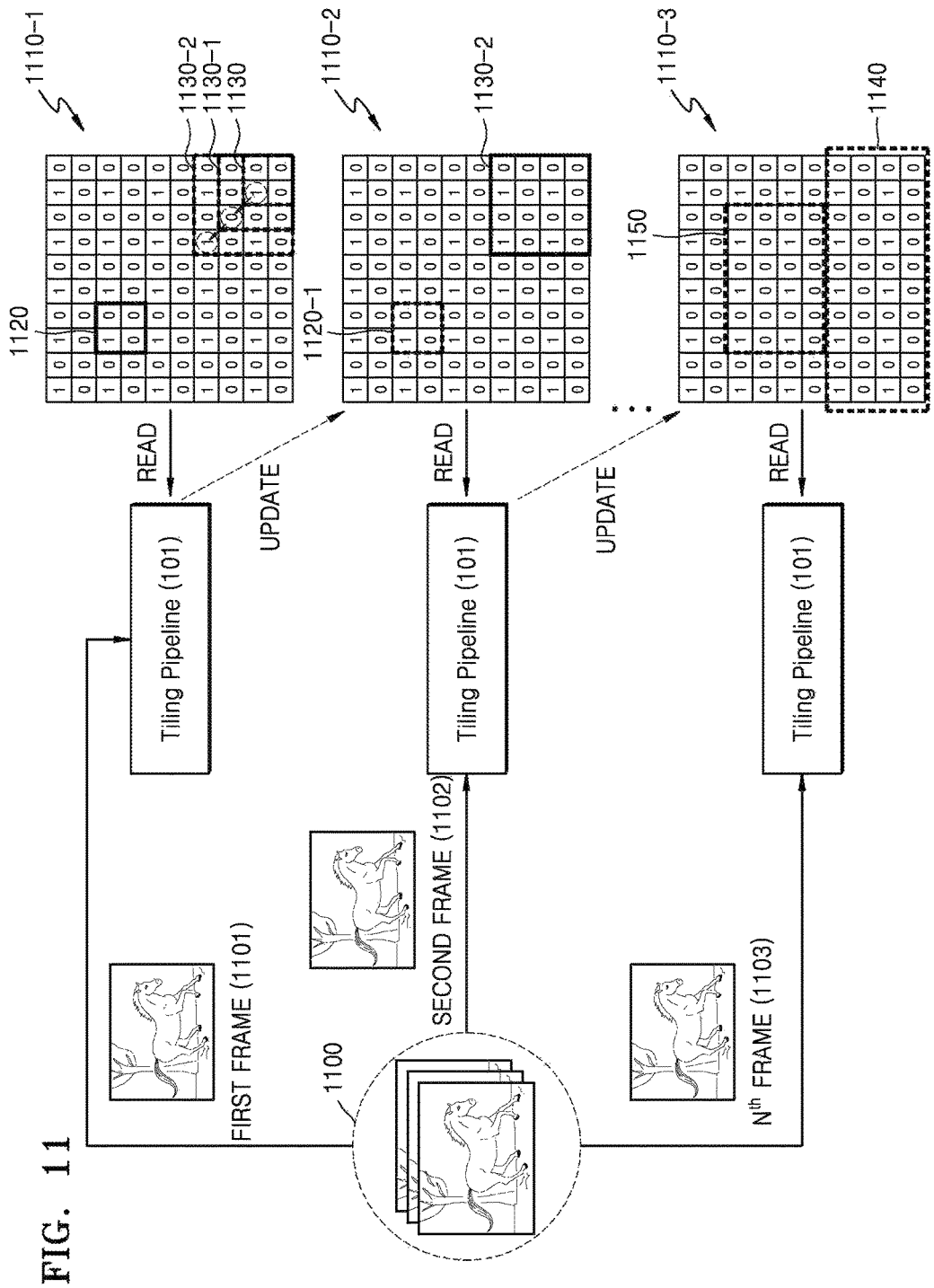
FIG. 11 is a diagram illustrating an example of a process of updating a tile grouping map.

FIG. 11 is a diagram illustrating a process of updating a tile grouping map according to an embodiment.

Referring to FIG. 11, the GPU 10 may perform a graphics pipeline including tiling pipeline 101 and a rendering pipeline 102, corresponding to N frames 1100 included in one image. For convenience of description, although the rendering pipeline 102 is not shown in FIG. 11, one of ordinary skill in the art may understand that the rendering pipeline 102 is performed after the tiling pipelines 101 are completed.

The tiling pipeline 101 may read tile grouping maps 1110 stored in the memory 30 (of FIG. 1) with vertices including objects included in the frames 1100, respectively. A tile grouping map 1110-1 read first may include branch points classifying tiles into 5×5 scalable tile groups. The map updater 940 (of FIG. 9) may compare respective sizes of bin streams generated per 5×5 scalable tile group with a threshold range (for example, 10 or more and 59 or less). For example, when a size of seventh scalable tile group 1120 exceeds 59, the map updater 940 may divide the seventh scalable tile group 1120 into four scalable tile groups including 1×1 tiles. Furthermore, when a size of a 25th scalable tile group 1130 is less than 10, the map updater 940 may adjust the size of the 25th scalable tile group 1130 to a scalable tile group 1130-1 including 3×3 tiles. In another example, to minimize computation, the size of the 25th scalable tile group 1130 may be adjusted to a scalable tile group 1130-2 including 4×4 tiles (in other words, including 2×2 scalable tile groups). The tiling pipeline 101 may store an updated tile grouping map 1110-2 in the memory 30 and may perform operations generating (or binning) a bin stream based on the updated tile grouping map 1110-2 with vertices including objects included in a second frame 1102.

The GPU 10 may update a tile grouping map N times while performing a graphics pipeline corresponding to N frames. As a result, a size of a scalable tile group 1140 corresponding to a region wherein sizes of primitives overlapping tiles are larger (or a region wherein primitives are not generated) may increase, while a size of a scalable tile group 1150 corresponding to a region wherein sizes of primitives overlapping tiles are smaller and concentrated may gradually decrease.

Frames included in one image may indicate continuous operations corresponding to same objects, and thus, an updated tile grouping map may be optimized to be suitable for an image. Furthermore, the processing efficiency of the tiling pipeline 101 may be improved.

Figure 12:
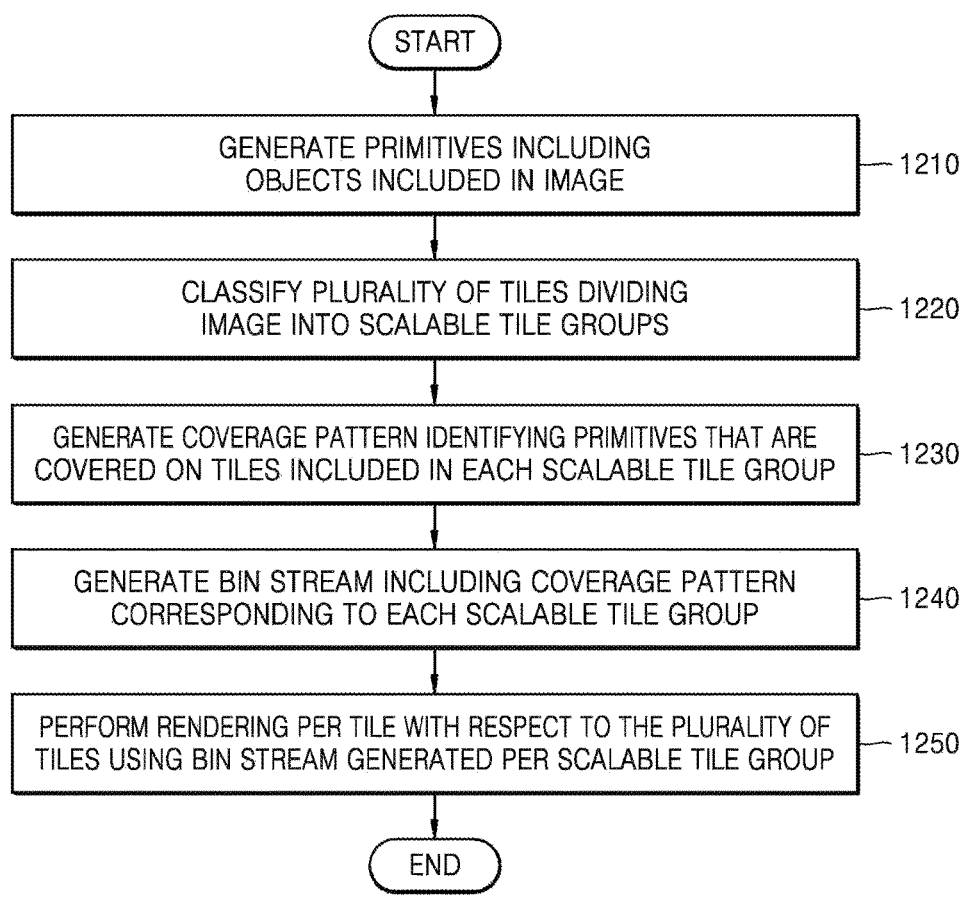
FIG. 12 is a diagram illustrating an example of a method of performing, by a GPU, a graphics pipeline.

FIG. 12 is diagrams illustrating an example of a method of performing, by the computing device 1, a graphics pipeline. The operations in FIG. 12 may be performed in the sequence and manner as shown, although the order of some operations may be changed or some of the operations omitted without departing from the spirit and scope of the illustrative examples described. Many of the operations shown in FIG. 12 may be performed in parallel or concurrently. The method of FIG. 12 is related to the embodiments described above with reference to FIGS. 1 through 11. Thus, in addition to the description of FIG. 12 below, the above descriptions of FIGS. 1-11, are also applicable to FIG. 12, and are incorporated herein by reference. Thus, the above description may not be repeated here.

FIG. 12 is a diagram illustrating a method of performing, by the GPU 10, a graphics pipeline.

Referring to FIG. 12, in 1210, the GPU 10 of the computing device 1 may generate primitives including objects included in an image. The CPU 20 of the computing device 1 may supply vertices indicating objects in an image stored in the memory 30 (of FIG. 1) to the GPU 10. The GPU 10 may perform shading (for example, vertex shading, domain shading, geometry shading, and so on) with the supplied vertices and may generate a primitive formed using at least one vertex.

In 1220, the GPU 10 may classify a plurality of tiles dividing an image into scalable tile groups. In an example, the scalable tile groups may include N×N tiles arranged in a square shape in an image.

Sizes of the scalable tile group may be determined based on at least one of a tile size or a resolution of the image. For example, when a tile size is 4×4 pixels, sizes of the scalable tile groups may be 16×16 tile sizes. Furthermore, when a tile size is 16×16 pixels, sizes of the scalable tile groups may be 4×4 tile sizes. In another example, sizes of the scalable tile groups may be determined according to an available space of a cache 630.

In 1230, the GPU 10 may generate a coverage pattern identifying primitives that are covered on tiles included in the scalable tile groups. The coverage pattern may be N×N bit strings indicating whether the N×N tiles included in the scalable tile group overlap the primitives.

For example, the GPU 10 may identify primitives covered on tiles by performing rasterization. Furthermore, the GPU 10 may generate a coverage pattern indicating information of the tiles in the scalable tile groups, wherein the tiles overlap the identified primitives.

In 1240, the GPU 10 may generate a bin stream including the coverage pattern corresponding to the scalable tile groups. The bin stream may be a bit stream generated per scalable tile group. Furthermore, the bin stream, corresponding to each of the scalable tile groups, may include information about the number of repetition times, in which coverage patterns corresponding to primitives and coverage patterns having the same bit strings are repeated. Furthermore, the bin stream may be a bit stream encoding the coverage patterns by using a run-length algorithm. The run-length algorithm is a lossless data encoding method of writing the number of data repetition times.

The GPU 10 may store the generated bit stream in a cache memory in the GPU 10. Therefore, the GPU 10 may reduce overheads in accessing the memory 30 (of FIG. 1) of the computing device 1.

In an example, operations 1210 through 1240 may be performed in components of the tiling pipeline 101 including the graphics pipeline of the GPU 10 or pipeline stages.

In 1250, the GPU 10 may perform rendering per tile with respect to a plurality of tiles using the bin stream generated per scalable tile group. For example, the GPU 10 may perform the rendering pipeline 102 per tile.

Figure 13:
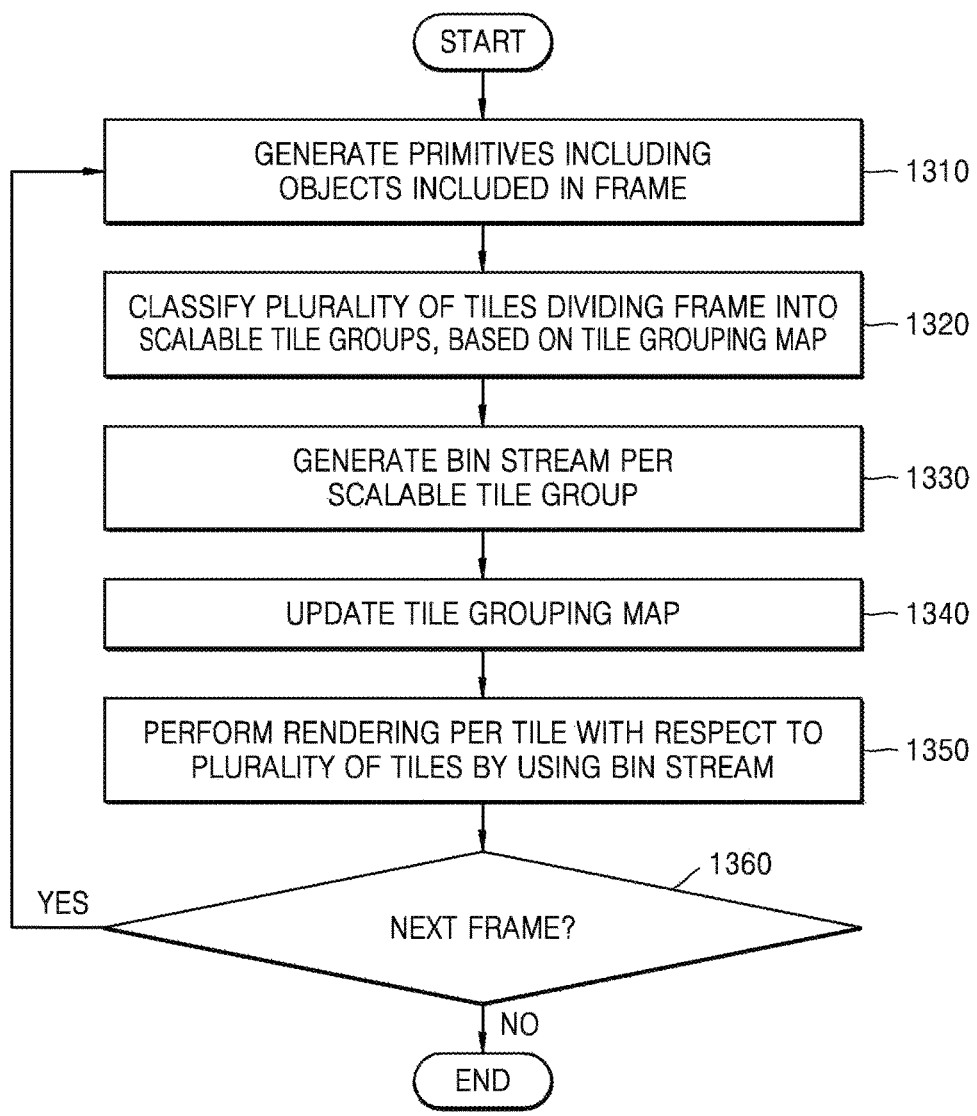
FIG. 13 is a diagram illustrating an example of a method of performing a graphics pipeline by using a tile grouping map in a GPU.

FIG. 13 is a diagram illustrating an example of a method of performing a graphics pipeline using a tile grouping map in the GPU 10, according to an embodiment. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. The method of FIG. 13 is related to the embodiments described above with reference to FIGS. 1 through 12. Thus, in addition to the description of FIG. 13 below, the above descriptions of FIGS. 1-12, are also applicable to FIG. 13, and are incorporated herein by reference. Thus, the above description may not be repeated here Referring to FIG. 13, in 1310, the GPU 10 of the computing device 1 may generate primitives including objects included in a frame (or an image).

The CPU 20 of the computing device 1 may sequentially supply vertices indicating objects included in each of a plurality of frames in a 2D or 3D image. The method of generating primitives of the GPU 10 corresponds to operation 1210 of FIG. 12, which is incorporated herein by reference. Thus, a detailed description thereof will be omitted.

In 1320, the GPU 10 may classify a plurality of tiles dividing a frame into scalable tile groups, based on a tile grouping map. The tile grouping map may include branch points to classify a plurality of tiles into scalable tile groups. Furthermore, the tile grouping map may be a bit string which has a same length as a length of the number of tiles (i.e., n×m). For example, the tile grouping map may include bits corresponding to tiles dividing a frame, respectively. Therefore, each bit of the tile grouping map may represent whether a tile corresponding to each bit is a branch point classifying tiles into scalable tile groups.

In an example, the tile grouping map may be stored in the memory 30 (of FIG. 1) or a cache memory in the GPU 10. Therefore, the GPU 10 may read the tile grouping map from the memory 30 (of FIG. 1) or the cache memory, and may classify a plurality of tiles into scalable tile groups based on branch points included in the tile grouping map.

In 1330, the GPU 10 may generate a bin stream per scalable tile group. The method of generating the bin stream of the GPU 10 corresponds to operations 1230 and 1240 of FIG. 12, which is incorporated herein by reference. Thus, a detailed description thereof will not be given.

In 1340, the GPU 10 may update the tile grouping map. The GPU 10 may update locations of branch points included in the tile grouping map 901, based on a size of a bin stream corresponding to each of the scalable tile groups.

For example, the GPU 10 may determine whether the size of the bin stream corresponding to each of the scalable tile groups is within a threshold range, and may update the tile grouping map 901 to reduce a size of corresponding scalable tile group if the size of the bin stream corresponding to each of the scalable tile groups is less than the threshold range. In another example, if the size of the bin stream bin stream is larger than the threshold range, the map updater 940 may update the tile grouping map 901 to increase a size of corresponding scalable tile group.

The threshold range may be determined based on at least one of a size of a coverage pattern or the number of primitives. For example, when a size of a coverage pattern is 4 and the number of primitives is 10, the threshold range may be 10 or more and 59 or less. This may reflect an average value of the sizes of bin streams, in which the average value may be generated by using a run-length algorithm. As such, the GPU 10 may prevent a generation of a bin stream having an excessively large size by adjusting a size of each of the scalable tile groups.

According to an embodiment, the GPU 10 may limit scalable tile group units in a square shape, to minimize computations of a tile grouping map. However, other shapes of the scalable tile group units, such as, for example rectangular scalable tile group may be generated by the GPU 10 without departing from the spirit and scope of the illustrative examples described In 1350, the GPU 10 may perform rendering per tile with respect to a plurality of tiles using the bin stream per scalable tile group. Operation 1350 corresponds to operation 1250 of FIG. 12, which is incorporated herein by reference. Thus a detailed description thereof will not be given.

In 1360, the CPU 20 of the computing device 1 may determine whether a next frame exists and may control the GPU 10 to perform operation 1310 if the next frame exists. Therefore, in 1320, the GPU 10 may classify a plurality of tiles dividing the next frame into scalable tile groups, based on the updated tile grouping map. Furthermore, in 1320, the GPU 10 may again update the tile grouping map. In general, frames included in one image may indicate continuous operations corresponding to same objects, and thus, an updated tile grouping map may be optimized to be suitable for an image. As a result, the processing efficiency of the GPU 10 may be improved.

If next frame does not exist, the CPU 20 of the computing device 1 may control the GPU 10 to stop operations.

The apparatuses, units, modules, devices, and other components illustrated that perform the operations described herein are implemented by hardware components. Examples of hardware components include controllers, sensors, generators, drivers and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array (FPGA), a programmable logic array, a microprocessor, an application-specific integrated circuit (ASIC), or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Also, when a communication with a remote computer or server is required by a processor of a computer to execute the above-described functions, the processor of the computer may further include information about how the communication is performed with the remote computer or server by using a communication module (for example, a wired and/or wireless communication module) of the computer, and about information or media to be exchanged during the communication.

The methods that perform the operations described herein are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

Hereinabove, all components according to the embodiments are described to be combined as one or are described to operate by being combined with each other, but an embodiment is not limited thereto. In other words, at least two of the components may selectively combine to operate within the scopes of the present disclosure. Also, the components may each be realized as independent hardware or some or all of the components may be selectively combined to be realized in one or more pieces of hardware.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of processing graphics data, the method comprising:
   generating primitives comprising objects in an image;
   classifying tiles dividing the image into scalable tile groups based on branch points in a tile grouping map;
   generating a coverage pattern identifying primitives that are covered on tiles comprised in each scalable tile group;
   generating a bin stream comprising the coverage pattern corresponding to the each scalable tile group; and
   performing rendering for each tile of the tiles using the bin stream.

2. The method of claim 1, wherein:
   the each scalable tile group comprises N×N tiles arranged in a square shape.

3. The method of claim 2, wherein:
   the coverage pattern comprises N×N bit strings indicating whether each tile of the N×N tiles comprises a primitive.

4. The method of claim 1, wherein:
   the bin stream further comprises information about the number of times coverage patterns have same bit strings.

5. The method of claim 4, wherein:
   the bin stream is a bit stream encoded using a run-length algorithm.

6. The method of claim 1, wherein; the classifying of the tiles comprises classifying the tiles based on at least one of a tile size or a resolution of the image.

7. The method of claim 1, wherein: the classifying of the tiles comprises classifying the tiles based on an available size of a cache memory.

8. The method of claim 1, wherein: the tile grouping map comprises a bit string having a length equal to a length of the number of tiles.

9. The method of claim 1, further comprising:
   reducing a size of a scalable tile group in response to the size of the bin stream being greater than a threshold range, and increasing the size of the scalable tile group, in response to the size of the bin stream being lesser than the threshold range.

10. A non-transitory computer-readable recording medium having recorded thereon a program for performing by a computer the method of claim 1.

11. A graphics processing device comprising:
    a controller configured
    to generate primitives comprising objects in an image;
    to classify tiles dividing the Image Into scalable tile groups based on branch points in a tile grouping map,
    to generate a coverage pattern identifying the primitives that are covered on tiles comprised in each scalable tile groups, and
    to generate a bin stream comprising the coverage pattern corresponding to the each scalable tile group; and
    a rasterizer configured to render each tile of the tiles using the bin stream.

12. The graphics processing device of claim 11, wherein:
    the each scalable tile group comprises N×N tiles arranged in a square shape.

13. The graphics processing device of claim 12, wherein:
    the coverage pattern comprises N×N bit strings indicating whether each tile of the N×N tiles comprises a primitive, respectively.

14. The graphics processing device of claim 11, wherein:
    the bin stream further comprises information about the number of times coverage patterns have the same bit strings.

15. The graphics processing device of claim 14, wherein:
    the bin stream is a bit stream encoded using a run-length algorithm.

16. The graphics processing device of claim 11, wherein:
    the controller is further configured to classify the tiles into the scalable tile groups, based on at least one of a tile size or a resolution of the image.

17. The graphics processing device of claim 11, further comprising:
    a cache storing the bin stream, and the controller is further configured to classify the tiles into the scalable tile groups based on an available size of the cache.

18. The graphics processing device of claim 11, wherein:
    the controller is further configured to update the tile grouping map, based on a size of the bin stream corresponding to the each scalable tile group.

* * * * *